United States Patent
Patel et al.

(10) Patent No.: US 8,484,366 B2
(45) Date of Patent: Jul. 9, 2013

(54) HIERARCHICAL SERVICE MANAGEMENT

(75) Inventors: Mehul B. Patel, Bangalore (IN); Murali Durbha, Hyderabad (IN); Srinivas Ramadath, Bangalore (IN); Sunil Raina, Issaquah, WA (US); Prashant Kanvihalli, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 751 days.

(21) Appl. No.: 12/751,384

(22) Filed: Mar. 31, 2010

(65) Prior Publication Data
US 2011/0167142 A1    Jul. 7, 2011

(51) Int. Cl.
*G06F 15/16* (2006.01)

(52) U.S. Cl.
USPC ............................ 709/230; 709/203; 709/217

(58) Field of Classification Search
USPC ................. 709/203, 216–217, 225–226, 230, 709/248
See application file for complete search history.

(56) References Cited

U.S. PATENT DOCUMENTS

| | | | |
|---|---|---|---|
| 2002/0138638 A1 | 9/2002 | Hermann et al. | |
| 2005/0165906 A1* | 7/2005 | Deo et al. ........................ | 709/217 |
| 2007/0133428 A1* | 6/2007 | Taylor et al. ................... | 370/252 |
| 2009/0249428 A1 | 10/2009 | White et al. | |

FOREIGN PATENT DOCUMENTS

WO    2009083976 A2    7/2009

OTHER PUBLICATIONS

Ioanna Roussaki, Virtual Home Environment: Building & Testing an Efficient Prototype, 2002, National Technical University of Athens (NTUA), Greece, 685-689.*
Sumi Helal,The Gator Tech Smart House: A Programmable Pervasive Space, 2005, University of Florida, 50-60.*
Tatsuo Nakajima, A Virtual Overlay Network for Integrating Home Appliances, 2002, 1-7.*
Loeser C et al: "Peer-to-peer networks for virtual home environments", System Sciences, 2003. Proceedings of The 36th Annual Hawaii International Conference on Jan. 6-9, 2003, Piscataway, NJ, USA, IEEE, Jan. 6, 2003, pp. 282-290, XPOI0626713, ISBN: 978-0-7695-1874-9 * chapters 2-5 on pp. 2-9 *.

* cited by examiner

*Primary Examiner* — Patrice Winder
*Assistant Examiner* — Ebrahim Golabbakhsh
(74) *Attorney, Agent, or Firm* — Mannava & Kang, P.C.

(57) ABSTRACT

A service management system includes data storage storing a hierarchy of a network in a user premises. The hierarchy includes virtual network layers and devices in each layer. The storage device also stores service profiles for services associated with levels in the hierarchy, and the levels include one or more of the virtual network layers. The system receives information for creating a service for a device in a layer. The information includes service functions and attributes. The system also stores a service profile for the service in the storage device, and the service profile includes the received information. The system determines whether to trigger the service based on the received data and information in the service profile.

16 Claims, 7 Drawing Sheets

HIERARCHICAL SERVICE MANAGEMENT

BACKGROUND

The digital-connected home is ubiquitous, and consumers today have high expectations for the kind of services they can get in their connected homes. The growth of digital services in the home has been primarily aimed at enabling connection of devices to a single local area network (LAN), and service providers deliver services into the home from outside the LAN to the devices connected to the LAN.

The primary premise for this model of providing services in the home is that service providers will be able to provide all the services needed in the home over a network. This model may be valid now; however, many factors hinder service providers from providing a full range of services to the home given this model. For example, the innumerable configurations across different systems and network devices in the home pose huge challenges for original equipment manufacturers (OEMs) and service providers to provide connectivity for receiving services. The connectivity problem also applies across software applications that may or may not have application program interfaces (APIs) for exchanging information with service providers. Generally, as more and more services are desired in the home, and with the explosion of different types of devices having different capabilities, as well as different interfaces, the full range of possible service scenarios may not be supportable by service providers outside the home.

In addition many of the services made available through service providers, for example, over the Internet or via a service provider network, are not customizable by the user or have a minimal number of settings that can be changed by the user. Thus, users are restricted by the type of available services and by the capabilities of their devices to be used to receive and administer the services.

BRIEF DESCRIPTION OF DRAWINGS

The embodiments of the invention will be described in detail in the following description with reference to the following figures.

DETAILED DESCRIPTION OF EMBODIMENTS

Figure 1A:
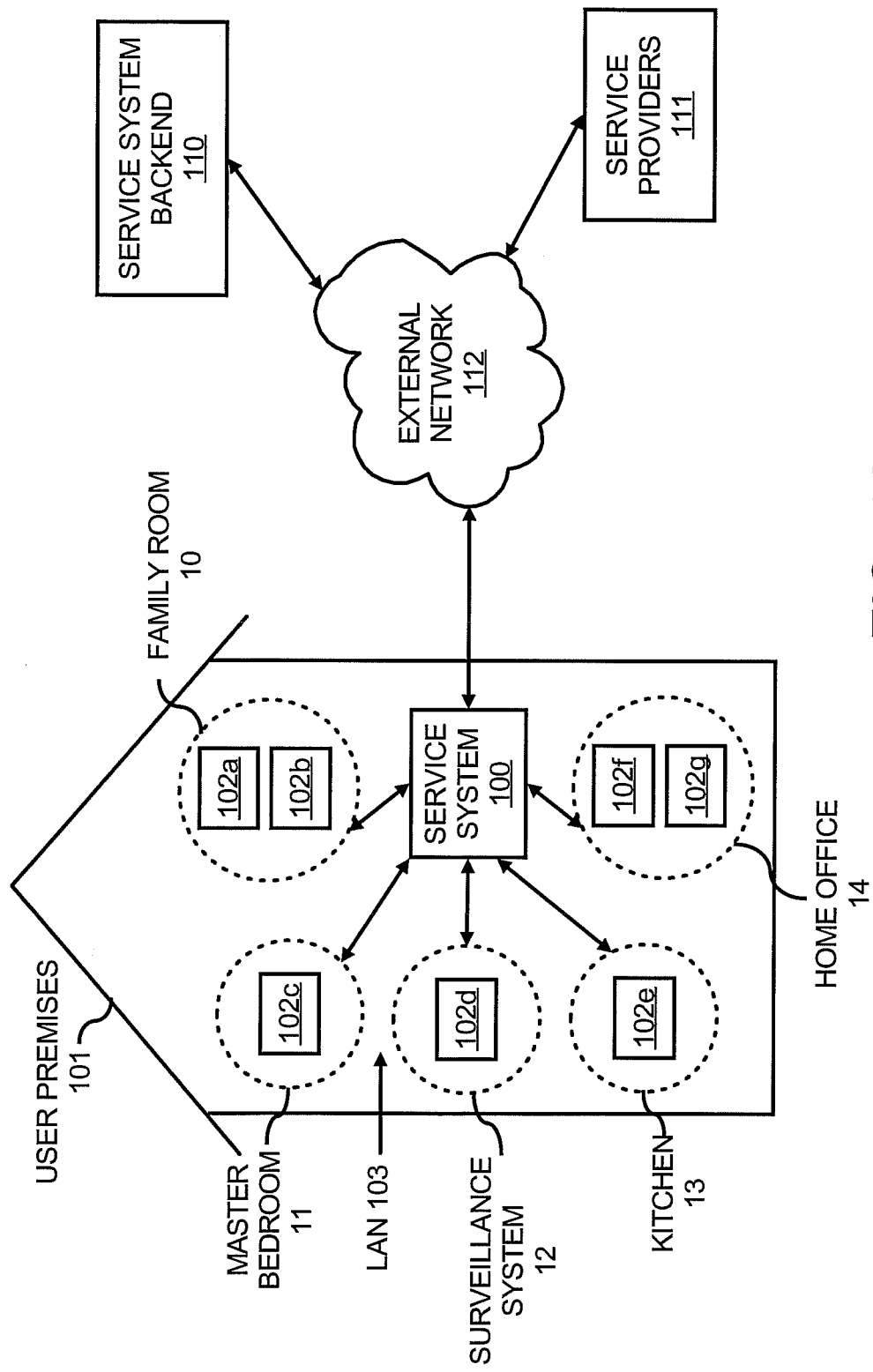
FIG. 1A illustrates a system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a service system provides a standard way for users to define services, and for network devices to provide or facilitate services at the user premises, such as the home, office, etc. The service system enables users to define, control and access services from the user premises directly, and the service provider may manage and control services as needed, such as for broader collaboration with devices outside the user premises. However, users may define services that are implemented without an outside service provider.

A service as used herein includes an action performed by a device. The action may be in response to a detected condition. For example, a service may include contacting a health care provider in response to detecting a medical condition. Another example of a service may be a coffee maker that makes coffee at a programmed time of day. Services may be more complicated, such as receiving data from a plurality of devices and orchestrating data sharing among the devices while implementing security measures and digital rights management. A device that performs a service may be a network device, which is a device that can connect to a network, such as a LAN or a peer-to-peer network or other shared-communication protocol in a user premises. Examples of devices may include personal computers, laptops, servers, cell phones, gaming devices, televisions, appliances, etc. Typically, the devices include some type of processor or processing circuitry, such as an application-specific integrated circuit (ASIC), and a computer readable storage device operable to store data and a computer program, which may be firmware. Also, the devices may include network interfaces for connecting to the network.

Many combinations of services can be defined and administered solely at the user premises through the service system, which includes hardware and software to enable defining and administering services at the user premises. Many different services that may not be feasible for an external service provider to implement due to cost limitations or infrastructure limitations can be provided through the service system.

According to an embodiment, the service system enables users to define services in a LAN or other type of network by creating virtual sections of the LAN, called virtual network layers. Network devices are assigned to one or more virtual network layers. A user may create a service by identifying a virtual network layer in the LAN and one or more devices within that virtual network layer that are to administer or use the service. A service function is also specified for the service, and the service function is stored in the service system. A service function may include one or more actions and conditions for a service. A condition may be a trigger for an action. Attributes for the service may also be specified by the user, and all the information for the service may be stored as a service profile in the service system. The attributes for the service may be related to access control, automation, etc. Other examples of attributes include setting the devices to receive a service if the service is triggered or setting the users to receive the service, such as users to receive shared content, if the service is triggered. Also, a syntax, such as predetermined service definition language, or templates or predetermined functions and attributes may be used to define services in a uniform manner and to provide a simplified way for users to provide information to create and manage services. A service is administered by the service system, which may be located within the LAN, rather than the service being administered by an external service provider.

FIG. 1A illustrates a service system 100, according to an embodiment. The service system 100 may be located within a user premises 101, such as a home or other user premises. The service system 100 includes a computer with a processor and a memory, such as the computer system shown in FIG. 6 and described below. The service system 100 may include input/output devices or a network interface that allows a user to interact with the service system 100. A user premises is not necessarily a building. For example, the user premises may be a geographic location, and the service system 100 operates on a network within the boundaries of the geographic location. The network may be wired, wireless or a combination of both, and may be a LAN operating within a small geographic location, such as a "hot spot" within a city.

The service system 100 collects data from network devices 102a-g via a network in the user premises 101, such as LAN 103. The service system 100 may be hardware and/or software comprising a separate network device or may be integrated with another network device, such as a router. The network devices 102a-g connected to the service system 100 are shown as being in the user premises 101, but one or more the network devices 102a-g may be outside the user premises. The service system 100 determines whether to trigger a service, and administers the service if the service is triggered. In one example, the service system 100 receives data from the network devices 102a-g. Based on the received data, the service system 100 determines whether conditions for the services are met that cause any of the services to be triggered. Conditions and actions for the services are stored in the service profiles in the service system 100. The service system 100 administers a triggered service, which includes performing actions specified in a service profile for the triggered service. This may include receiving and sending data for the service to one or more of the network devices 102a-g or to service providers 111, which are connected to the service system 100 via external network 112. The external network 112 may include service provider networks, the Internet, etc.

The service system 100 also may store a hierarchy of the LAN 103. The hierarchy includes one or more virtual network layer with one or more devices in each layer. Examples of virtual network layers are shown in FIG. 1A as family room 10, master bedroom 11, surveillance system 12, kitchen 13, and home office 14. The devices may include network devices, such as the network devices 102a-g in the layers 10-14.

Figure 1B:
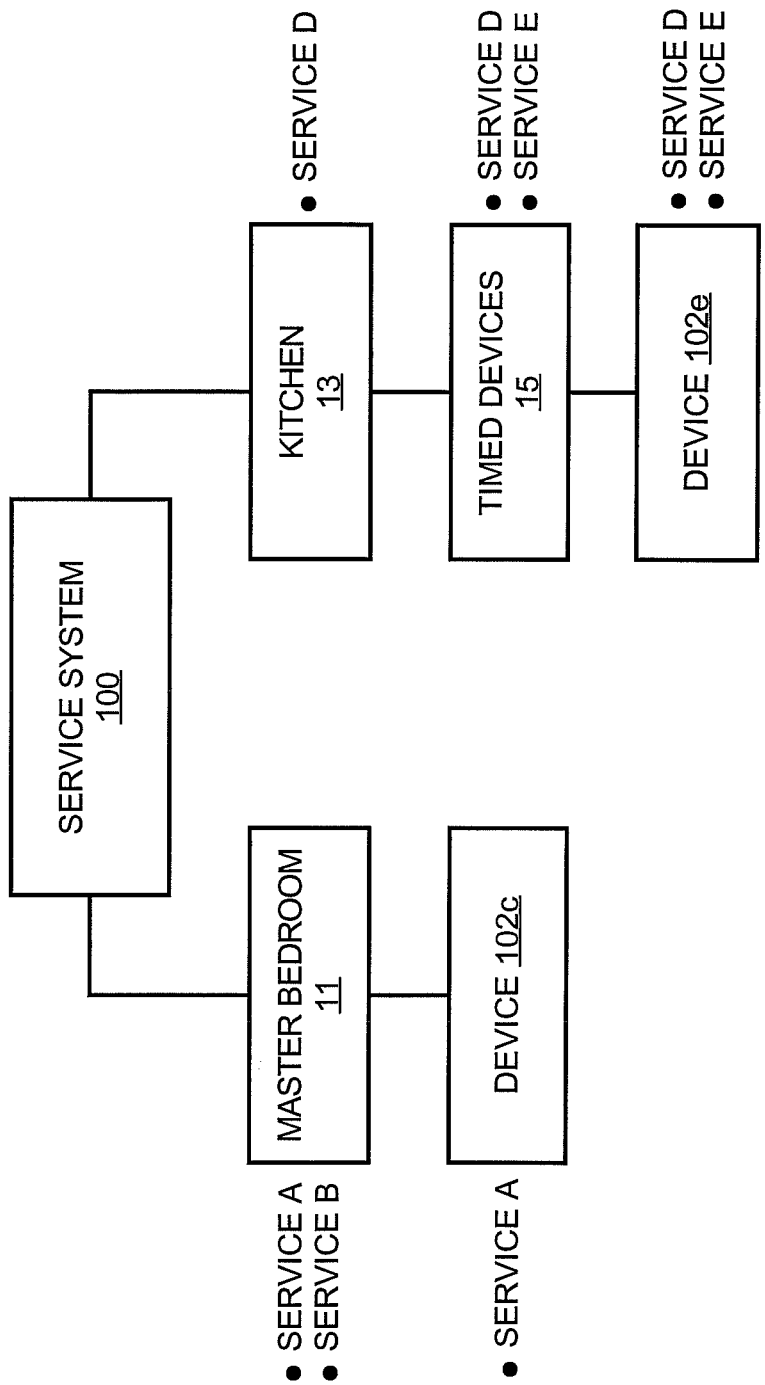
FIG. 1B illustrates a portion of a hierarchy, according to an embodiment.

The stored hierarchy may also identify one or more services for one or more levels of the hierarchy, and examples of services in different levels are shown in FIG. 1B. An example of a portion of the hierarchy is shown in FIG. 1B. For example, the service system 100 is at the root. The master bedroom virtual network layer 11 is at one level of the hierarchy and includes network device 102c at another level, which is a child level to the parent level of the master bedroom virtual network layer 11. Another level of the hierarchy includes the kitchen virtual network layer 13. Under that level is a timed devices level 15, and under that level is the network device 102e. The hierarchy also may include one or more services for each level. For example, the master bedroom virtual network layer 11 includes services A and B, and the network device 102c level includes the service A. The kitchen virtual network layer 13 includes service D. The timed devices level 15 includes services D and E, and the level for the network device 102e includes services D and E. Note that services may be manually assigned to a level depending on whether the service is applicable to the level. For example, if the level includes a network device that uses or performs the service, then the service is associated with the level by a user interacting with the service system 100 through a user interface to request the service to be associated with the level.

The parent-child structure of the hierarchy may be used for inheriting services, including functions and/or attributes. In one embodiment, a service associated with a particular level in the hierarchy is applicable to that particular level and all children levels of that particular level. Thus, a service need not be manually associated with each child level.

In another embodiment, computerized matching of service and level attributes may be performed by the service system 100 or service system backend 110 (e.g., a server or other computer system) to associate or assign a service to a level. A service profile is created and stored, describing attributes of the service. Also, a level profile is created and stored for each level, describing attributes of the level. Then, one or more attributes of the level profile are matched with attributes of stored service profiles to identify services that may be relevant to the level. A user may then select one or more services from the matched services for the level. The information for hierarchies, services, and other information described herein may be stored at the service system 100 or at an external computer, such as the service system backend 110, accessible by the service system 100. Note that the service system 100 may be configured to accept manual selections or computerized matches of services to be associated with levels of the hierarchy.

Based on services assigned to a level in the hierarchy, the service system 100 is able to identify any services that are to be analyzed to determine whether they are triggered. For example, the service system 100 receives data from the network device 102e. From the hierarchy, the service system 100 identifies that services D and E are associated with the network device 102e. The service system 100 retrieves the service profiles for the services D and E and from information in the profiles and the received data, determines whether any of the services D and E are triggered. The hierarchy is further described below with respect to methods 300 and 400. In addition to using the hierarchy to determine whether a service is triggered, the service system 100 may use the hierarchy for creating services, as is further described below. Only a portion of the hierarchy is shown in FIG. 1B for purposes of illustration, and the actual stored hierarchy may include information for all the levels of the hierarchy.

Hierarchies are not limited to virtual layers of a LAN. A hierarchy includes multiple levels and the levels are related by a common theme or similar attributes. In the example above, the common theme is a network with virtual network layers and the virtual network layers are based on room type or device function. In another example, a hierarchy may be based on granularities of geographic locations. For example, a hierarchy may include groups of homes with levels for state, zip code, city, town, street, etc. In another example, user premises may be grouped by one or more common attributes other than geographic locations. For example, one group representing a level in a hierarchy may include homes with children in elementary school. A child group under that parent group, i.e., in a lower level of the hierarchy, may include children that play soccer. Individual homes may be below the child group. Services associated with the common attributes of a group may be created and matched with the groups. For example, a service identifying soccer field conditions and soccer promotions may be provided for a particular group.

The service system 100 may group homes based on information profiles created for each user premises, referred to as user premises profiles. Each user premises profile may include information about a particular user premises captured from Internet usage at the user premises or information provided by individuals living at the user premises or information captured through other means. The user premises profiles may be matched with service profiles to identify and associate services with a group of homes or an individual home. The matching may be performed by a user requesting the service system 100 to associate a service with a user premises or group of user premises, and/or matching may be performed by the service system 100 or the service system backend 110 matching attributes of a user premises profile with a service profile. Hence, a service may be associated with one or more levels of the hierarchy and triggered when service condition(s) for the service are met. One or more service conditions may be specified for each service and stored in each service profile. Also, one or more service conditions may be specified for a level or multiple levels, and the condition(s) may be inherited by child levels. A stored level or layer profile may include the conditions. Furthermore, services can be created and matched for individuals or network devices, for an entire user premises or groups of user premises. Hierarchies may be stored in the service system 100 of each user premises 101 and in a service system backend 110 described below.

According to an embodiment, service matching may be performed by identifying a pattern of common attributes for multiple user premises. For example, a pattern may include children from different user premises that attend the same school and are involved in similar extracurricular activities, or a pattern of similar online buying habits for multiple user premises may be identified. A group is created for multiple user premises that share the common attributes. Then, services are matched with the groups. The creation of groups and matching of user premises and triggering of services may be performed by the service system 100 and/or the service system backend 110.

Also, services may be aggregated in a single hierarchy or across different hierarchies. Aggregation of services may include combining a plurality of services to perform certain actions. In one example, the service profiles of services that are combined store links to each other, so if one service is activated, the service system 100 identifies the link and performs the other service. Aggregation of services may include targeting and triggering services based on conditions associated with multiple hierarchies. For example, one hierarchy may include user premises, groups of user premises, and further grouping the groups of user premises by geographic locality. Another hierarchy may be within a user premises based on users. For example, parents may be at the root, then children, and then relatives. A premium movie channel television service is targeted for a group of homes in the first hierarchy but based on rules for the user-based hierarchy in the user premises, the service is not made available to the children.

Referring back to FIG. 1A, the service providers 111 may provide additional services. The service system 100 may communicate with the service providers 111 to provide additional services for the network devices 102a-n and users of the service system 100. The service system backend 110 may include backend servers for the service system 100 and other service systems at other user premises. The backend 110 manages service-related functions including communicating with third-party services. Also, services may be created and stored on the backend 110 and distributed to service systems, such as service system 100. Also, the backend 110 may store applications and software development kits for creating applications. The applications are software realizations for services. The applications may include software agents that are loaded onto one or more of the network devices 102a-n that allows the devices to communicate with the service system and execute service-related functions. Also, the applications may include service profiles or service functions that are distributed to service systems.

Figure 2:
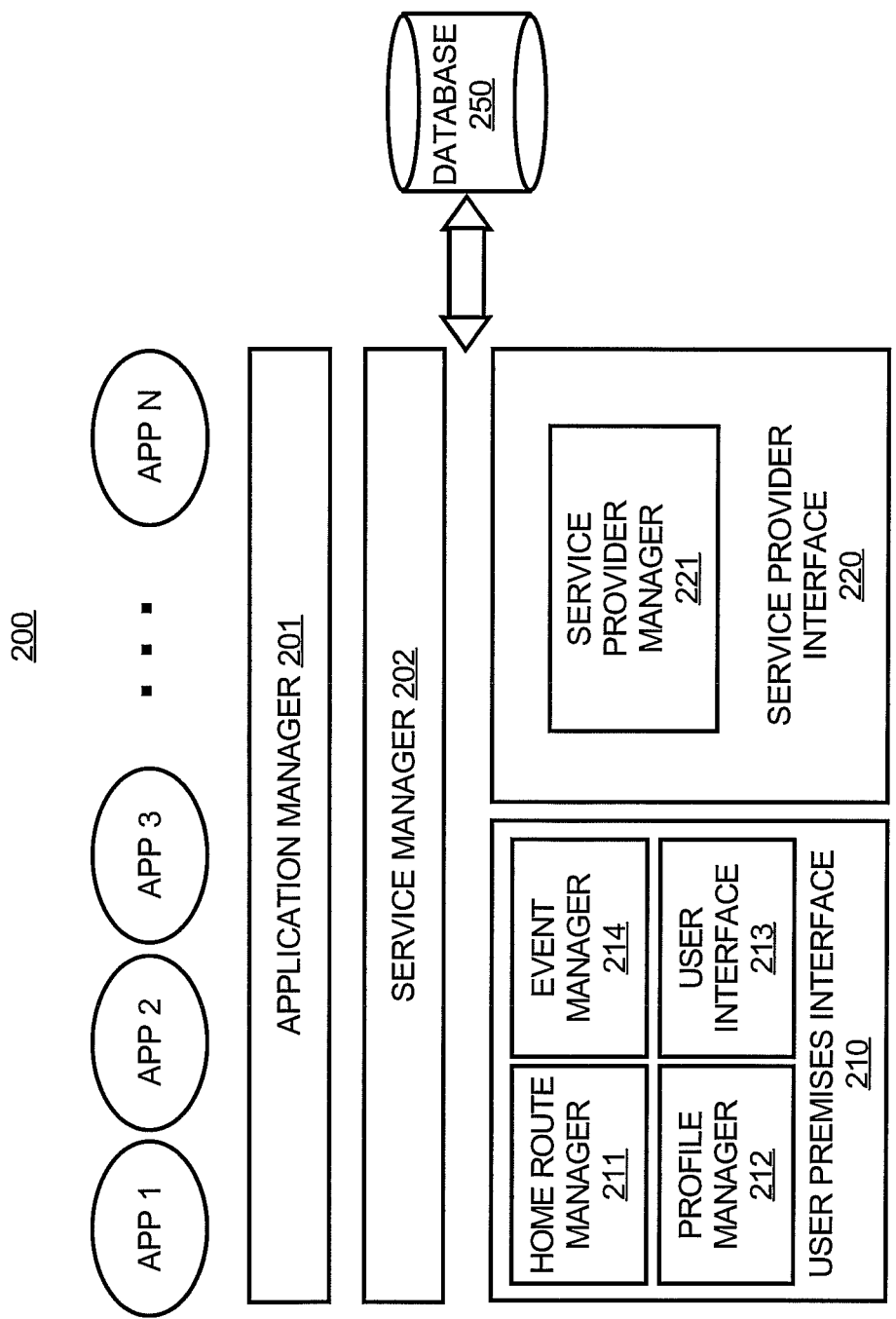
FIG. 2 illustrates an architecture for a service system, according to an embodiment.

FIG. 2 illustrates an architecture 200 for the service system 100, according to an embodiment. The architecture 200 may include applications 1-n stored in the service system 100, an application manager 201, a service manager 202, a database 250, a user premises interface 210 and a service provider interface 220. Database 250 may store information about one or more hierarchies for a user premises. The information may include service profiles, device profiles, information describing the structure of the hierarchies and relationships between levels. The database 250 also may store information about each level, such as the services associated with each level and an identification of any child or parent levels.

Application manager 201 registers and manages the applications 1-n and represents a platform for running applications. Managing applications may include loading and running applications as needed. Service manager 202 registers and manages services, including storing service profiles. The service manager 202 also performs runtime functions, including determining whether a service is triggered and triggering services, which may include performing service functions. The service manager 202 also creates and stores service profiles when services are created.

A user premises interface 210 includes a route manager 211 for interfacing with network devices, a profile manager 212, a user interface 213 and an event manager 214. Profile manager 212 determines information for device profiles for the network devices and stores the profiles. The information for device profiles may include device attributes describing characteristics of the device and functions describing functions that can be performed by the device. User interface 213 provides the interface for users to create service profiles and to enter any user information that may be used by the service system 100 to perform the functions of the service system 100 described herein. The service profile information entered by a user through the user interface may include attributes for the service and service conditions for the service. The service profile may include a link to other services for aggregating the service with another service. Also, a syntax, such as predetermined service definition language, or templates or predetermined functions and attributes may be used to define services in a uniform manner and to provide a simplified way for users to provide information to create and manage services.

Event manager 214 stores information for predetermined events, such as whether a predetermined event occurred, when it occurred, etc. The information stored by event manager 214 may be used to determine whether to trigger a service.

Service provider interface 220 provides an interface for interfacing with external systems, such as the external service providers 111 and the service system backend 110 shown in FIG. 1A. The service provider interface 220 includes a service provider manager 221 that can download applications or a catalogue of available applications via external network 112. The components of the architecture 200 may include software modules stored on a computer readable storage device and executed by a processor to perform the functions of the service system 100. The service system 100 may perform other functions and include other modules not shown.

Figure 3:
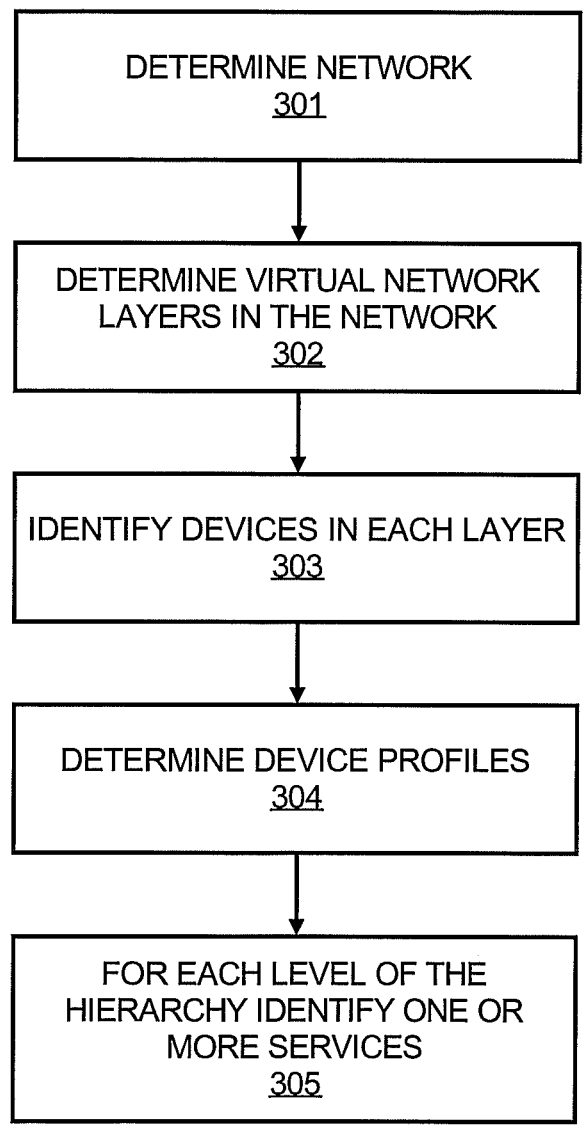
FIG. 3 illustrates a method for determining a network hierarchy that can be used to define and implement services, according to an embodiment.

FIG. 3 illustrates a method 300 for determining a network hierarchy that can be used to define and implement services, according to an embodiment.

Once determined, the hierarchy is stored in service system 100. The hierarchy includes multiple levels, such as shown in FIG. 1B. The levels may include parent-child relationships.

For example, a child level below a parent level may inherent service functions and attributes of the parent level. Referring to FIG. 1B as an example, the kitchen virtual network layer is a parent level and the time devices sub-layer is a child. Also, the hierarchy may be in the form of a tree having a root at the highest level. Branches off the root form lower levels.

At step 301, the network is determined. For example, a network address for a home LAN is determined. The LAN address is stored in the service system 100. The LAN address may be an IP address that can be used to send information to devices in the LAN from outside the LAN.

At step 302, virtual network layers in the network are determined and stored in the service system 100. The virtual network layers identify a virtual separation between devices in the network. In one example, the virtual network layers are defined based on room type. For example, the network is a home LAN. The virtual network layers may include a family room layer, home office layer, a kitchen layer, a bathroom layer, a master bedroom layer, etc. In another example, the virtual network layers are defined based on device type. For example, the virtual network layers may include content-sharing devices, appliances, home security devices, mobile devices, utility devices (e.g., power meters, gas meters, etc.), medical devices, gaming devices, etc. Other types of virtual network layers may be defined based on other criteria. Also, different sets of virtual network layers may be defined and used in one hierarchy. For example, a virtual network layer set based on room type and a virtual network layer set based on device type are both defined.

Also, sub-layers under virtual network layers may be defined. For example, under a kitchen layer shown in FIG. 1B, there is a timed devices sub-layer for all network devices that may be controlled based on a time of day, such as a coffee machine, a rice cooker, etc. Another example of a sub-layer may be a content-sharing sub-layer, which may include a TV or PC in the kitchen.

At step 303, devices in each layer are identified and stored in the service system 100. For example, a refrigerator may be in a kitchen layer and a desktop personal computer may be in a home office layer. A device may be included in more than one layer. For example, a laptop may be in a home office layer, a mobile device layer, and a content-sharing device layer. In one embodiment, the device profiles for devices in the user premises are stored, and then each layer or level of the hierarchy is associated with one or more device profiles for one or more devices in the respective level or layer. The association of a device profile to a layer or level may be provided by storing a device profile ID for each associated device profile in a database table for the layer or level.

At step 304, device profiles for the network devices are determined. The device profiles may include unique device identifiers, such as MAC addresses, and functions and capabilities for the devices. The device profiles may also include interface information, such as whether the device is a plug-n-play (PnP), network interface information, security information, etc.

At step 305, for each level of the hierarchy, one or more services are identified. For example, the hierarchy shown in FIG. 1B is stored in the service system 100 in a data structure. Services are associated with each level as shown in FIG. 1A. Note that a level may include a child or parent level.

The services associated with each level may include service functions and attributes. A service function is an action and/or condition for a service. A service attribute may be a service setting or some other feature or characteristic of a service. In one embodiment, a service, including a function and/or attributes, defined for a particular level in the hierarchy is applicable to that level and all levels that are children of the particular level or layer. For example, at the network root layer, functions and attributes may be defined that are applicable to all services in all levels of the hierarchy. For example, a security setting is made at the root layer and that security setting is applicable across all layers in the hierarchy. In another example, a medical device layer is created. That layer may represent a single level in the hierarchy. Services are stored for the layer, including functions and attributes. One function may include the ability to alert a care giver if a condition is satisfied. Another function may be to generate a local alert on a particular device if a condition is satisfied. These functions and attributes may be applicable to all sub-layers of the medical device layer. Functions and attributes may also be specified for devices in another level in the hierarchy. In another example of functions and attributes, for the timed devices sub-layer shown in FIG. 1B, the service D specifies for a coffee machine to make coffee at a specific time, and to notify a user when done. An attribute may identify a user device to send a notification.

The information determined or otherwise identified or used by the methods described herein may be stored in a computer readable storage device in the service system 100. Examples of the computer readable storage device are described with respect to FIG. 6. The service system 100 may retrieve the information as needed to perform the functions of the service system. Also, the methods described herein are described with respect to the service system 100 by way of example and not limitation. The methods may be performed in other systems.

Figure 4:
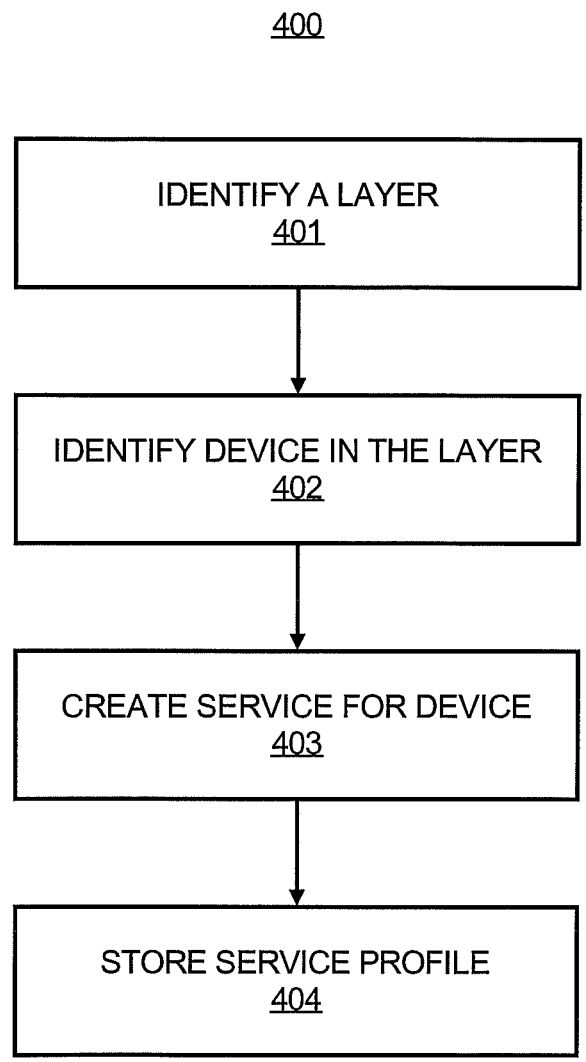
FIG. 4 illustrates a method for creating services, according to an embodiment.

In addition to storing the hierarchy and devices in or under each level, service system 100 also stores the functions and attributes defined for each level of the hierarchy and uses these functions and attributes to create services. FIG. 4 describes a method 400 for creating services, according to an embodiment.

At step 401, a level of the hierarchy is identified by a user. This level may include a virtual network layer or a child level to the virtual network layer. In particular, the service system 100 includes a user interface that is operable to present to the user the hierarchy, device profiles and other information stored by the service system 100. The user may select a virtual network layer in a level of the hierarchy through the user interface. The selected level is associated with the service the user is creating.

At step 402, a device in the identified level is identified by the user. The service system 100 may present information from the device profiles for devices in the identified level in the hierarchy. The user may select a device from the level through the interface. The device is associated with the service the user is creating.

At step 403, a service is created for the device selected at step 402. The service may be created based on the functions and attributes of the selected device previously specified and stored at the service system 100. For example, a menu may be generated showing the predetermined functions and attributes of the device. Some of the information may be provided through the device profile. The user may select a function for the device to be used for the service. The user may also specify other functions for a service that are not shown via the menu. The user may also specify one or more conditions for triggering the service.

At step 404, a service profile is created including the information from step 403, and the service profile is stored in the service system 100, such as in the database 250 shown in FIG. 2. The service profile may include a unique service ID that can be used to identify the service which is profiled by the service profile. The service profile includes a function, such as an action that is performed by the device. Attributes may also be included in the service profile. Examples of attributes for a service may include the devices to share content, security settings, or any characteristic that may be set for a service. The service profile also includes one or more conditions for triggering the service. The service profile is stored in the system 100 and associated with a device and a virtual network layer that the device is a member. Thus, each level of the hierarchy may include one or more service profiles associated with the level. The system 100 may identify service profiles for a level when triggering services, as is described with respect to the method 500.

Figure 5:
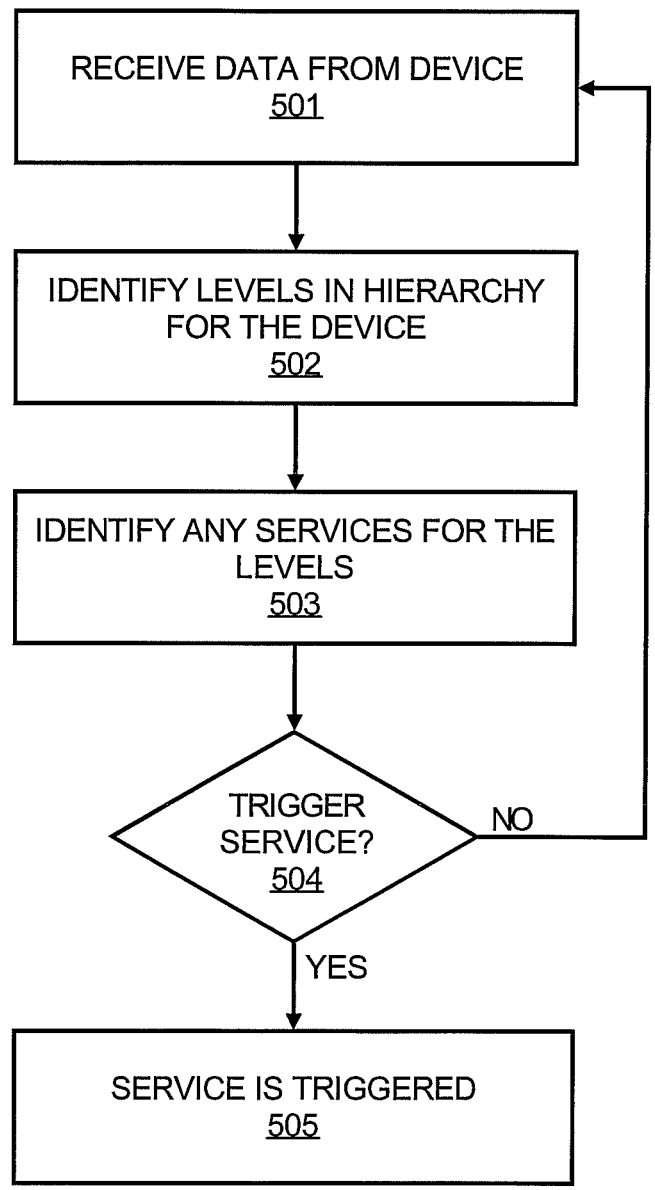
FIG. 5 illustrates a method for determining whether to trigger a service, according to an embodiment.

FIG. 5 illustrates a method 500 for determining whether to trigger a service, according to an embodiment. At step 501, the service system 100 receives data from a network device at the service system 100.

At step 502, all levels in the hierarchy that are associated with the device are determined. Referring to FIG. 1B, for example, levels including the master bedroom and the device 102c are identified for the device 102c. Determining the levels associated with the network device may be performed by the service system 100 querying the database 250 shown in FIG. 2 using a unique device ID for the network device. The database 250 returns an indication of all levels associated with the network device. The associations of devices to each level were previously stored in the database 250.

At step 503, services associated with the device are determined based on the levels. For example, services A and B are identified for the device 102c shown in FIG. 1B. This may include services for virtual network layers and sub-layers of which the device is a member. Determining the services associated with the levels may be performed by the service system 100 querying the database 250 shown in FIG. 2 for the services associated with the levels. For each level, the database 250 previously stored unique service IDs for all services associated with each level. Each service ID may be associated with a service profile. The retrieved service IDs thus identify the services for the associated levels.

At step 504, the service system 100 determines whether any of the identified services are triggered based on the received data. The determination may be based on determining whether a condition for a function in a service is satisfied from the received data. The condition may be specified in the service profile when the service profile is created or may be added later to the service profile. In one simplified example, the device is a medical device that senses blood sugar level of a user. If the blood sugar level for the user is below a threshold, then the service of sending an alert is triggered. The service system 100 may receive the blood sugar level data and determine whether the blood sugar level is below the threshold. If service system 100 determines that the blood sugar level data is below a threshold, it may identify a service to trigger. Alternatively, the device may determine that the blood sugar level is below a threshold and send a blood sugar flag to service system 100 where a service is identified for triggering (e.g., service system 100 may send one or more alerts based upon the received data). The device may perform the service or at least some functions of the service. For example, the device sends an alert to an external service provider, and the external service provider sends a nurse, doctor, or ambulance to the user premises. Attributes for the service may indicate which devices or entities are to receive the alert and through which channels the alerts are to be sent, such as phone, text, email, etc. Thus, if a service is identified that is to be triggered, then, at step 504, the service is triggered and the service is performed. Triggering the service may include initially performing the service or performing an action for a service that was already started.

Figure 6:
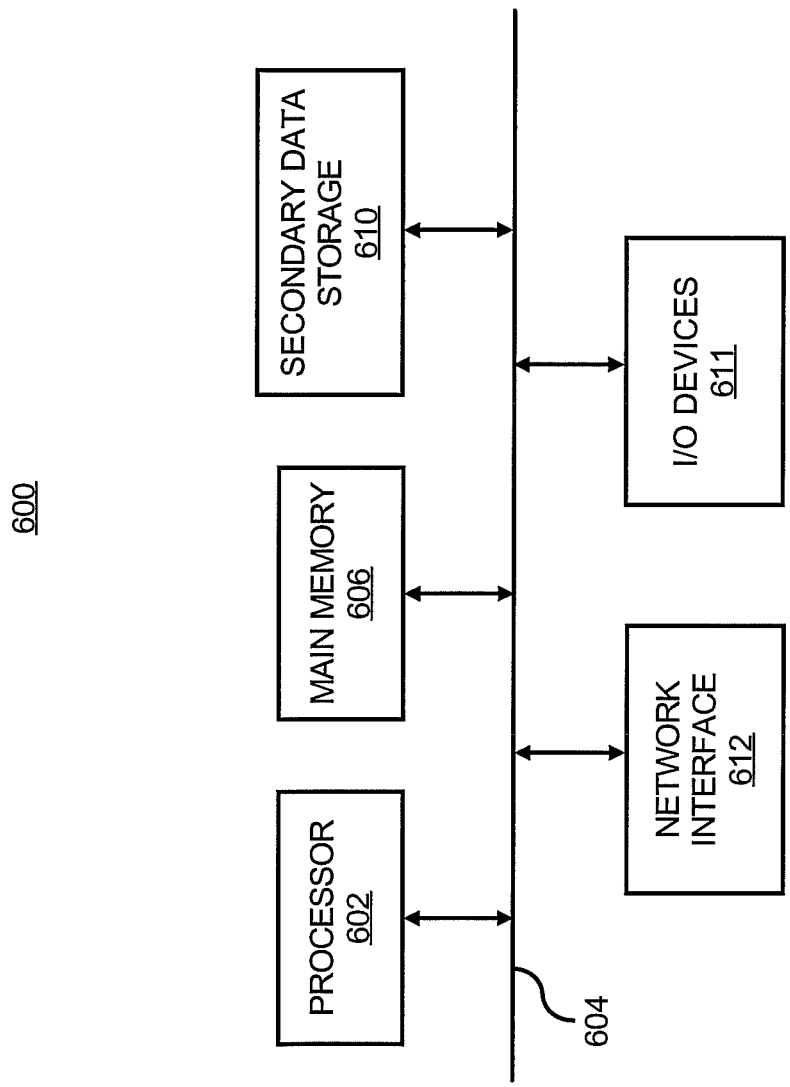
FIG. 6 illustrates a hardware platform for the service system, according to an embodiment.

FIG. 6 shows a computer system 600 that may be used as a hardware platform for the service system 100. The computer system 600 may be used as a platform for executing one or more of the methods, functions and other steps described herein. These steps may be embodied as software stored on one or more computer readable storage devices, which are hardware storage devices.

The computer system 600 includes a processor 602 or processing circuitry that may implement or execute software instructions performing some or all of the methods, functions and other steps described herein. Commands and data from the processor 602 are communicated over a communication bus 604. The computer system 600 also includes computer readable storage devices, such as a main memory 606, e.g., a random access memory (RAM), where the software and data for processor 602 may reside during runtime, and a secondary data storage 608, which may be non-volatile and stores software and data. The memory and second data storage are examples of types of storage devices that may be used to store data and computer programs for the service system 100. The computer system 600 may include a network interface 612 for connecting to a network, and I/O devices 111, such as keyboard, display, etc., that allows a user to interact with the computer system 600. It will be apparent to one of ordinary skill in the art that other known electronic components may be added or substituted in the computer system 600.

One or more of the steps of the methods described herein and other steps described herein and one or more of the components of the systems described herein may be implemented as computer code stored on a computer readable medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A method of providing at least one service using a hierarchy, the method comprising:

storing a hierarchy of a network including virtual network layers and devices in each layer, wherein the virtual network layers divide the network based on categories of devices in each layer and at least one of the virtual network layers includes at least one sub-layer under the at least one virtual network layer in the hierarchy, wherein the at least one sub-layer includes a different category of devices than the at least one virtual network layer;

storing service profiles for services associated with a plurality of levels in the hierarchy, the plurality of levels including at least one of the virtual network layers;

receiving information for creating a first service for at least one of the devices, wherein the information includes at least one of the stored service functions and attributes;

storing a first service profile for the first service, the first service profile including the received information;
receiving data from the at least one of the devices; and
determining whether to trigger the first service based on the received data and information in the first service profile.

2. The method of claim 1, wherein the method further comprises:
receiving a request to generate the first service, wherein the request identifies a level in the hierarchy for the first service;
presenting at least one service function and at least one attribute for the level from the stored service functions and attributes for the level;
receiving the information for creating the first service, wherein the information includes a selection of a service function or an attribute from the presented at least one service function and at least one attribute for the level; and
creating the first service using the selection.

3. The method of claim 2, wherein creating the first service further comprises:
storing the selected service function or attribute in the first service profile, wherein the first service profile identifies a condition and an action for performing the first service.

4. The method of claim 1, wherein a function or attribute for a first level in the hierarchy is also applied to all levels under the first level in the hierarchy.

5. The method of claim 1, wherein the method further comprises:
storing a user premises hierarchy, wherein one or more levels of the user premises hierarchy each include a plurality of user premises and a service associated with each of the one or more levels.

6. The method of claim 5, wherein the method further comprises:
matching each of the one or more levels with the associated service by identifying common attributes between the user premises in the levels and the services.

7. A method of determining whether to trigger a service using a hierarchy, the method comprising:
storing a hierarchy of a network including virtual network layers and devices in each layer, wherein the virtual network layers divide the network based on categories of devices in each layer and at least one of the virtual network layers includes at least one sub-layer under the at least one virtual network layer in the hierarchy, wherein the at least one sub-layer includes a different category of devices than the at least one virtual network layer;
storing service profiles for services associated with a plurality of levels in the hierarchy, the plurality of levels including at least one of the virtual network layers;
receiving information for creating a first service for at least one of the devices, wherein the information includes at least one of the stored service functions and attributes; storing a first service profile for the first service, the first service profile including the received information;
storing a user premises hierarchy, wherein one or more levels of the user premises hierarchy each include a plurality of user premises and a service associated with each of the one or more levels;
aggregating the hierarchy of the network and the user premises hierarchy and
determining whether to trigger the first service based on the received data, information in the first service profile, and the aggregated hierarchy of the network and the user premises hierarchy.

8. A service system managing services for user premises, the service system comprising:
a storage device storing a hierarchy of a network in the user premises, the hierarchy including virtual network layers and devices in each layer, and the storage device stores service profiles for services associated with a plurality of levels in the hierarchy, the plurality of levels including at least one of the virtual network layers,
wherein the virtual network layers divide the network based on categories of devices in each layer and at least one of the virtual network layers includes at least one sub-layer under the at least one virtual network layer in the hierarchy, wherein the at least one sub-layer includes a different category of devices than the at least one virtual network layer;
a service manager computer system receiving information for creating a first service for at least one of the devices, wherein the information includes at least one of the stored service functions and attributes, and the service manager computer system stores a first service profile for the first service in the storage device, the first service profile including the received information; and
the service manager computer system determining whether to trigger the first service based on the received data and information in the first service profile.

9. The service system of claim 8, further comprising:
a user interface receiving a request to generate the first service, wherein the request identifies a level in the hierarchy for the first service, and the user interface presents at least one service function and at least one attribute for the level from the stored service functions and attributes for the level.

10. The service system of claim 9, wherein the user interface receives the information for creating the first service, wherein the information includes a selection of a service function or an attribute from the presented at least one service function and at least one attribute for the level; and
the service manager computer system creates the first service using the selection.

11. The service system of claim 10, wherein the service manager computer system creates the first service by including the selected service function or attribute in the first service profile, and the first service profile identifies a condition and an action for performing the first service.

12. The service system of claim 8, wherein a function or attribute for a first level in the hierarchy is also applied to all levels under the first level in the hierarchy.

13. The service system of claim 8, wherein the storage device stores a user premises hierarchy, wherein one or more levels of the user premises hierarchy each include a plurality of user premises and a service associated with each of the one or more levels.

14. The service system of claim 13, wherein the service manager computer system matches each of the one or more levels with the associated service by identifying common attributes between the user premises in the levels and the services.

15. The service system of claim 13, wherein the service manager computer system aggregates the hierarchy of the network and the user premises hierarchy to determine whether to trigger a service for a user of the user premises.

16. A computer system configured to manage one or more services, the computer system comprising:

data storage storing a hierarchy of a network in the user premises, the hierarchy including virtual network layers and devices in each layer, and the storage device stores service profiles for services associated with a plurality of levels in the hierarchy, the plurality of levels including at least one of the virtual network layers, wherein the virtual network layers divide the network based on categories of devices in each layer and at least one of the virtual network layers includes at least one sub-layer under the at least one virtual network layer in the hierarchy, wherein the at least one sub-layer includes a different category of devices than the at least one virtual network layer; and a processor receiving information for creating a first service for at least one of the devices, wherein the information includes at least one of the stored service functions and attributes, and the service manage stores a first service profile for the first service in the storage device, the first service profile including the received information, and the processor determines whether to trigger the first service based on the received data and information in the first service profile.

\* \* \* \* \*